US007921985B2

(12) United States Patent
Huang

(10) Patent No.: US 7,921,985 B2
(45) Date of Patent: Apr. 12, 2011

(54) CONVEYING METHOD FOR ARTIFICIAL STONE PROCESS

(76) Inventor: Jame Huang, Yang Mei (TW)

(*) Notice: Subject to any disclaimer, the term of this patent is extended or adjusted under 35 U.S.C. 154(b) by 0 days.

(21) Appl. No.: 12/078,539

(22) Filed: Apr. 1, 2008

(65) Prior Publication Data

US 2010/0276251 A1 Nov. 4, 2010

(51) Int. Cl.
*B65G 47/52* (2006.01)
*B65G 49/00* (2006.01)

(52) U.S. Cl. ............... 198/463.3; 198/465.1; 198/463.1; 198/817; 198/468.8

(58) Field of Classification Search ........................ None
See application file for complete search history.

(56) References Cited

U.S. PATENT DOCUMENTS 3,877,386 A * 4/1975 Wakabayashi ............. 104/172.1
4,363,595 A * 12/1982 Reichenbach et al. ...... 198/463.3
5,039,270 A * 8/1991 Parks et al. ................... 414/286
5,064,046 A * 11/1991 Janotik et al. ............. 193/35 SS

* cited by examiner

*Primary Examiner* — Gene Crawford
*Assistant Examiner* — Kavel Singh
(74) *Attorney, Agent, or Firm* — Wang Law Firm; Li K. Wang

(57) ABSTRACT

A conveying method for an artificial stone process comprises placing stone on a trolley equipped with a catch basin, the trolley traveling along a track set to carry the stone to a processing region which has a top bracing unit, when the trolley carrying the stone to the processing region, the catch basin being braced upwardly and separated from the trolley, an engaging mechanism receiving the catch basin and delivering it to a processing station, thereby processing the stone on the catch basin.

9 Claims, 22 Drawing Sheets

CONVEYING METHOD FOR ARTIFICIAL STONE PROCESS

BACKGROUND OF THE INVENTION (a) Field of the Invention

The present invention relates to an artificial stone process, and, more particularly, to a conveying method for an artificial stone process.

(b) Description of the Prior Art:

In an artificial stone process, various quarry run stone is subjected to a crushing treatment, followed by adding the mixture and mixing/stirring, and an artificial stone blank is obtained by vacuum forming under high pressure. and vibration. Then, the artificial stone blank is subjected to sawing processing, patterning processing, compressing processing or polishing processing, or the like, in accordance with the demand for products.

However, in each stage of processing conventional artificial stone blanks, due to the relatively heavy weight of the artificial stone blanks, when executing different processing operations, the stone blanks are hung by a crown block and transported to each processing station for processing. Nevertheless, the transportation velocity of the stone blanks hung and delivered by a crown block is highly restricted. If the transportation velocity were too high, the suspended stone blanks would sway vigorously and result in not only the difficulty of entering the processing stations but also a potential serious hazard to the operators. Furthermore, the crown block occupies a large amount of space so that it is easily constrained by the site and cannot be flexibly arranged in situ, that is, the transportation path for transporting artificial stone blanks is very inflexible so as to lose the effect of division of labor and simultaneous operation.

SUMMARY OF THE INVENTION

The primary objective of the present invention is to provide a conveying method for an artificial stone process, which has the features of rapid transportation and high smoothness.

Another objective of the present invention is to provide a conveying method for an artificial stone process, which has the effect of division of labor and simultaneous operation, thereby enhancing the efficiency of an artificial stone process.

To achieve the foregoing objective, the present invention provides a conveying method for an artificial stone process comprising the following steps:

(a) charging step: placing stone on a trolley provided with a catch basin;

(b) transporting step: the trolley traveling along a track set to carry the stone to a processing region;

(c) discharging step: the processing region having a top bracing unit, the top bracing unit being equipped with a plurality of backup posts, when the trolley carrying the stone to the processing region, the catch basin being braced upwardly by the backup posts of the top bracing unit and separated from the trolley;

(d) engaging step: after the catch basin being top braced by the backup posts of the top bracing unit and separated from the trolley, utilizing an engaging mechanism to receive the catch basin, wherein the engaging mechanism is comprised of two junction rails opposite and parallel to each other, and at least one pushing assembly is disposed between the two junction rails such that the two junction rails can expand and draw closer to each other, and when the two junction rails expand, the catch basin can pass between the two junction rails, and after the catch basin braced upwardly by the backup posts passes between the two junction rails, the two junction rails can be acted by the pushing assembly and start to draw closer to each other, and at this time, the backup posts start to descend such that the catch basin is received by the two junction rails which have drawn closer to each other; and (e) processing step: delivering the catch basin, which is located on the junction rails of the engaging mechanism, to a processing station for processing.

The above and other objects and advantages of the present invention will become apparent from the following detailed description of the preferred embodiments given in conjunction with the accompanying drawings.

It is definite that the present invention can vary in some alternatives, or in the arrangements of alternatives, but the detailed description of the preferred embodiments will be made in this application, whose structure is demonstrated in the accompanying drawings.

DETAILED DESCRIPTION OF THE PREFERRED EMBODIMENTS

Figure 1:
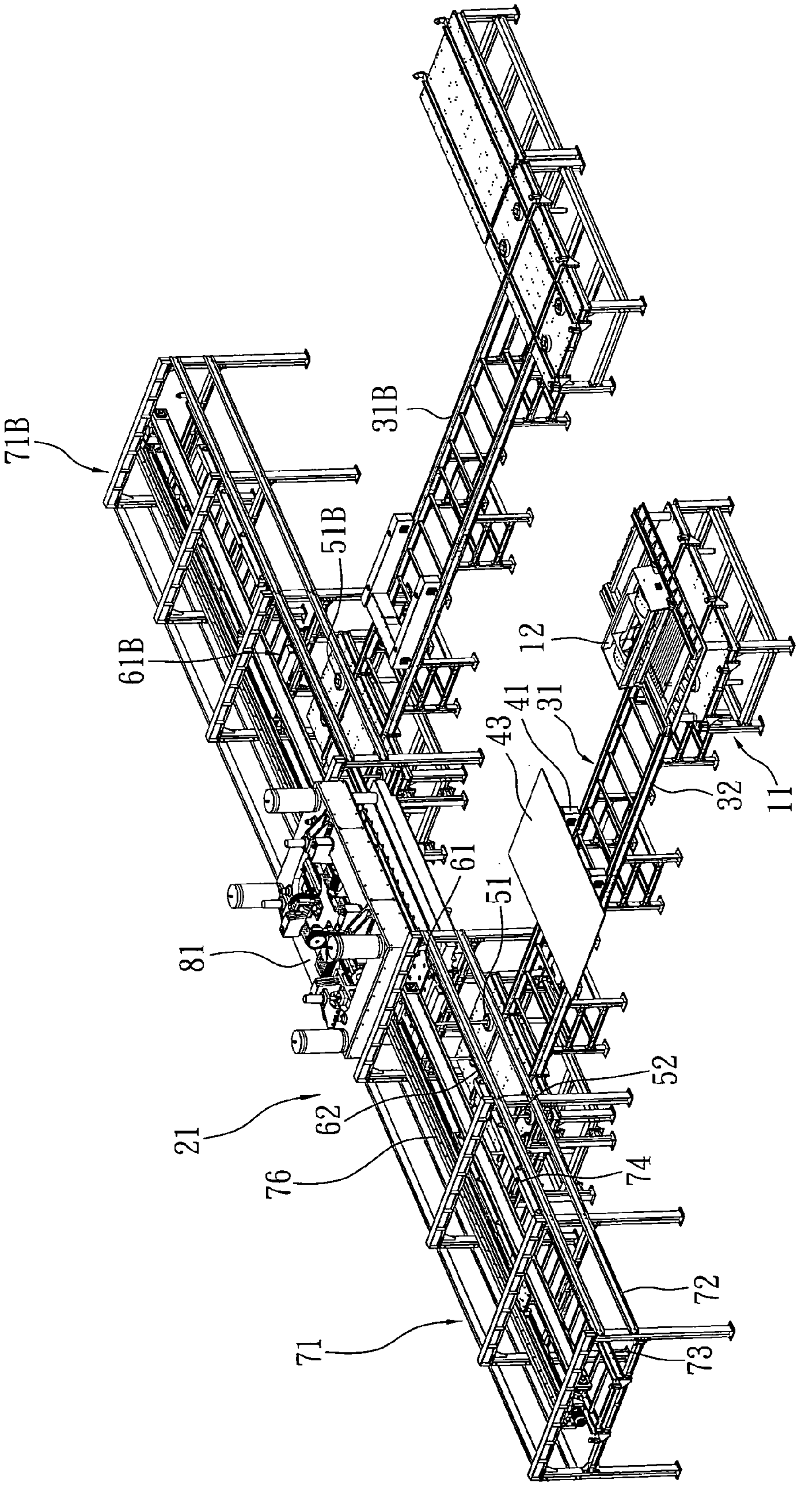
FIG. 1 is a three-dimensional schematic view of the present invention.

Referring to FIG. 1, the conveying method for an artificial stone process according to the present invention conveys stone between a waiting region 11 and a processing region 21 by a conveyor system, and the conveyor system is comprised of a track set 31, a trolley 41, a top bracing unit 51, an engaging mechanism 61 and a draft gear 71.

Wherein the track set 31 is comprised of two rails 32 which are symmetrical and arranged parallel to each other, and the track set 31 extends from the waiting region 11 to the processing region 21. A spreader 12 is disposed in the waiting region 11, which is employed to provide the stone to be processed.

Figure 2:
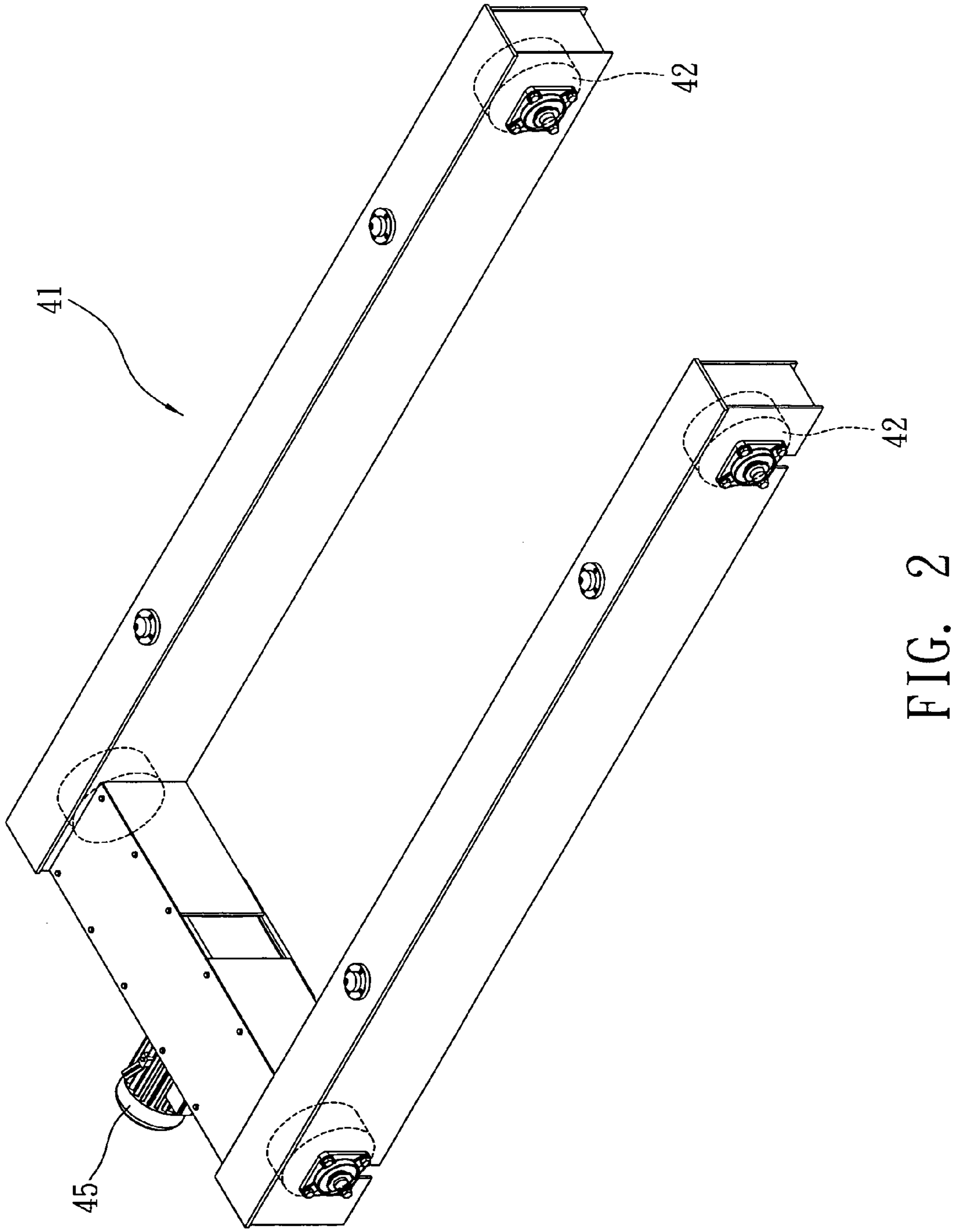
FIG. 2 is a three-dimensional schematic view showing a trolley according to the present invention.

The trolley 41 is mounted on the track set 31. Referring to FIG. 2, the trolley 41 is of a U-shaped frame form, and a number of pulleys 42 are disposed at the bottom on each of both sides of the long axis of the trolley 41, and the trolley 41 is provided therein with a power source 45 to actuate the pulleys 42 on the trolley 41 such that the trolley 41 can move along the track set 31 and perform transportation between the waiting region 11 and the processing region 21. A catch basin 43 is positioned on the trolley 41 and is used to carry the stone to be processed (not shown) .

The top bracing unit 51 is disposed in the processing region 21 and has a plurality of backup posts 52. In this embodiment, each of the backup posts 52 is comprised of an oil cylinder which can perform a back and forth top bracing movement. After the trolley 41 carries the stone to the processing region 21, the backup posts 52 just correspond to the bottom of the catch basin 43 such that the catch basin 43 is braced upwardly by the backup posts 52 and separated from the trolley 41. A plurality of taper holes (not shown) are provided on the bottom of the catch basin 43, and each of the taper holes and each of the backup posts 52 of the top bracing unit 51 correspond to each other. When each of the backup posts 52 of the top bracing unit 51 is braced upwardly against the catch basin 43, each of the backup posts 52 is corresponding to and inserted into each of the taper holes respectively such that the top bracing unit 51 can be firmly braced upwardly against the catch basin 43.

Figure 3:
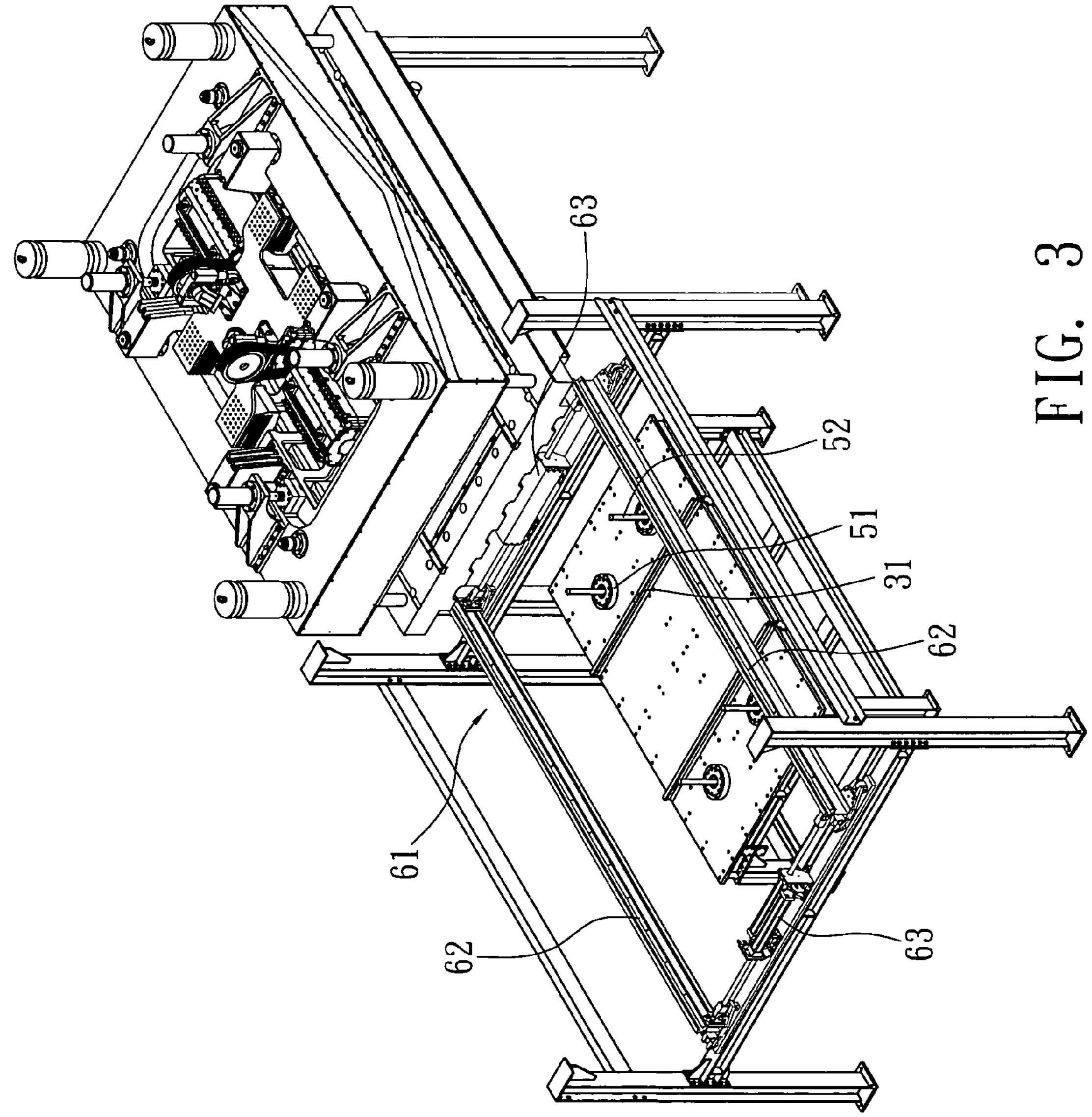
FIG. 3 is a three-dimensional schematic view showing an engaging mechanism according to the present invention.

The engaging mechanism 61 is disposed at the processing region 21 and located above the top bracing unit 51. Referring to FIG. 3, the engaging mechanism 61 is comprised of two junction rails 62 which are opposite and parallel to each other, and at least one pushing assembly 63 is disposed between the two junction rails 62. In this embodiment, the pushing assembly 63 is comprised of two oil cylinders such that the two junction rails 62 can expand and draw closer to each other by linking up with the pushing assembly 63.

Figure 4:
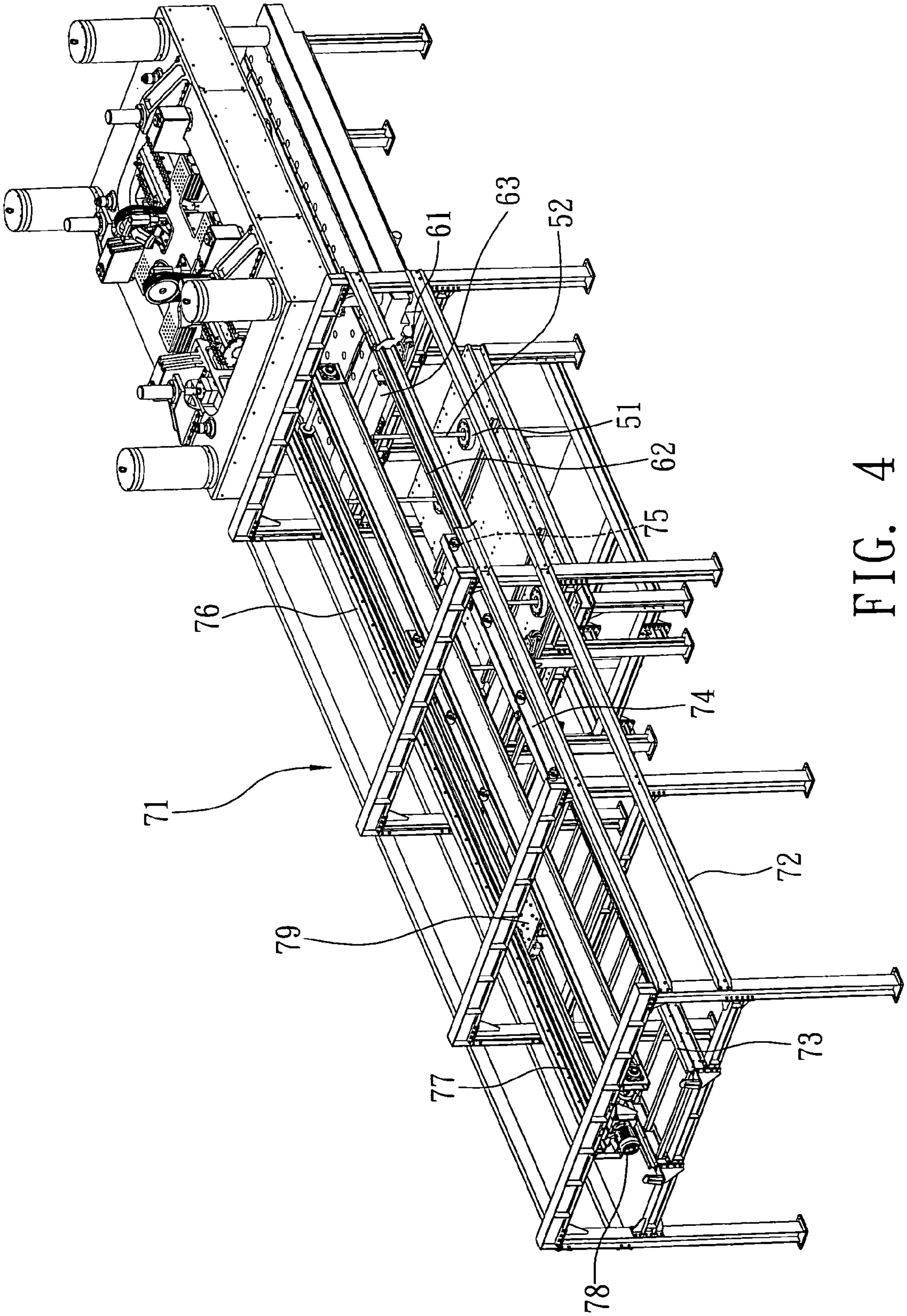
FIG. 4 is a three-dimensional schematic view showing a draft gear according to the present invention.

The draft gear 71 is disposed on one side of the engaging mechanism 61, as shown in FIG. 4. The draft gear 71 has an outer frame 72, and the outer frame 72 is provided thereon with intermediate rails 73. When the two junction rails 62 of the engaging mechanism 61 have drawn closer to each other, the intermediate rails 73 and the two junction rails 62 are docked with each other. A secondary trolley 74 of U-shaped frame form is disposed on the intermediate rails 73 and straddles both sides of the intermediate rails 73 by means of pulleys 75 mounted on both sides in the long axis direction of the secondary trolley 74. A drag rail 76 is disposed at the upper position of the intermediate rails 73, and the drag rail 76 is parallel and opposite to the intermediate rails 73. The drag rail 76 is provided therein with a belt gear 77 which can be actuated by a power source 7.8 to drive a drag member 79 to move along the drag rail 76. One end of the drag member 79 is connected to the belt gear 77 in the drag rail 76 and the other end of the drag member 79 is connected to the end of the secondary trolley 74 such that when the drag member 79 is driven by the belt gear 77, the drag member 79 can link up with the secondary trolley 74 and enable it to slide between the intermediate rails 73 and the junction rails 62 which have drawn closer to each other.

It should be noted that the mode for conveying the secondary trolley 74 is not limited to the above by actuation using the drag member 79 in coordination with the belt gear 77. For example, a power source, which can actuate the pulleys 75 of the secondary trolley 74, is directly mounted on the secondary trolley 74 and can similarly actuate the secondary trolley 74 to move between the intermediate rails 73 and the junction rails 62 which have drawn closer to each other. Therefore, All such driving modes, which can drive the secondary trolley 74 to move on the junction rails 62 which have drawn closer to each other thereby to receive the catch basin 43, are deemed equivalents to the present invention.

Figure 5:
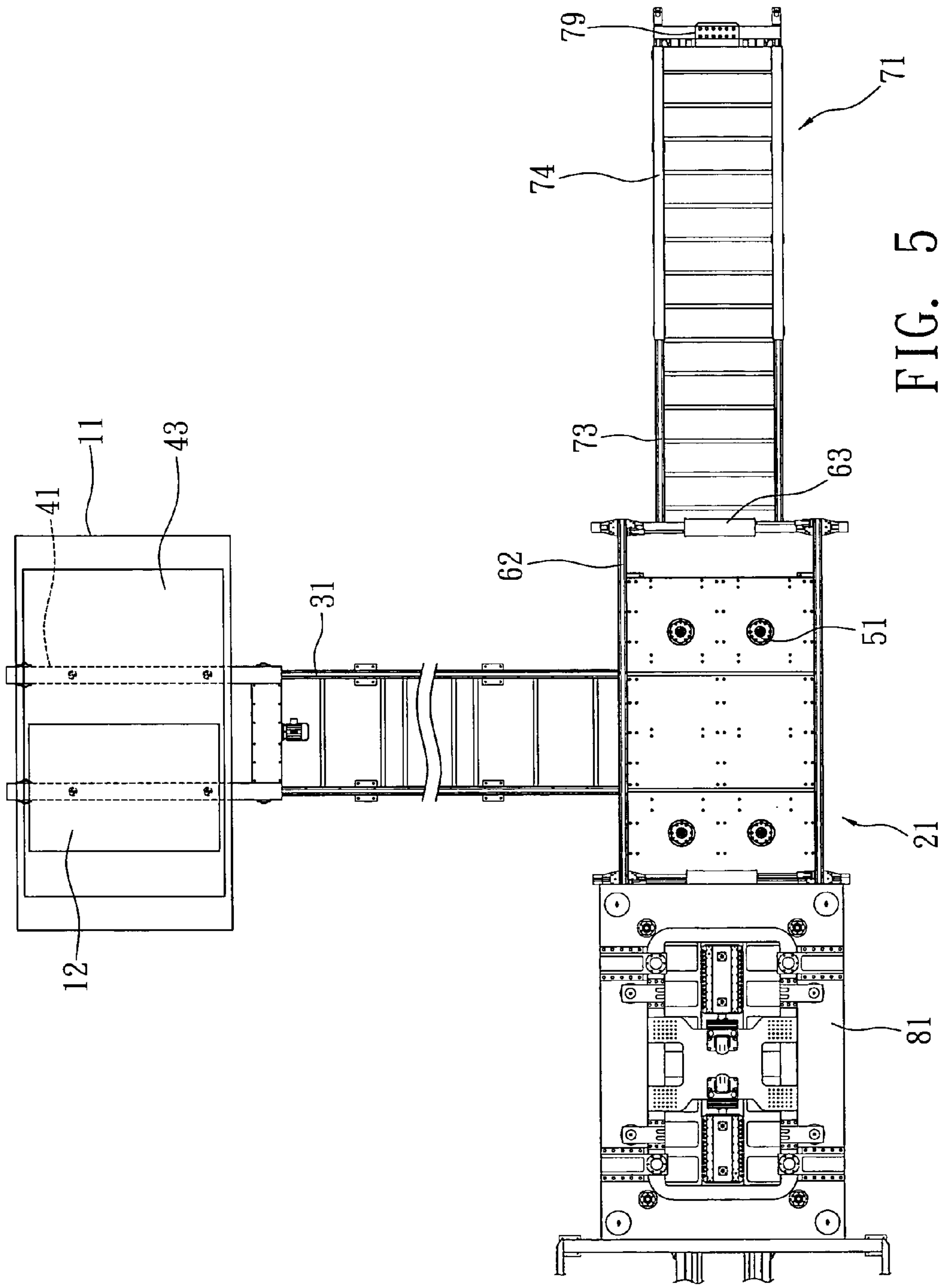
FIGS. 5 to 18 are schematic flowcharts of the conveying method according to the present invention.
Figure 6:
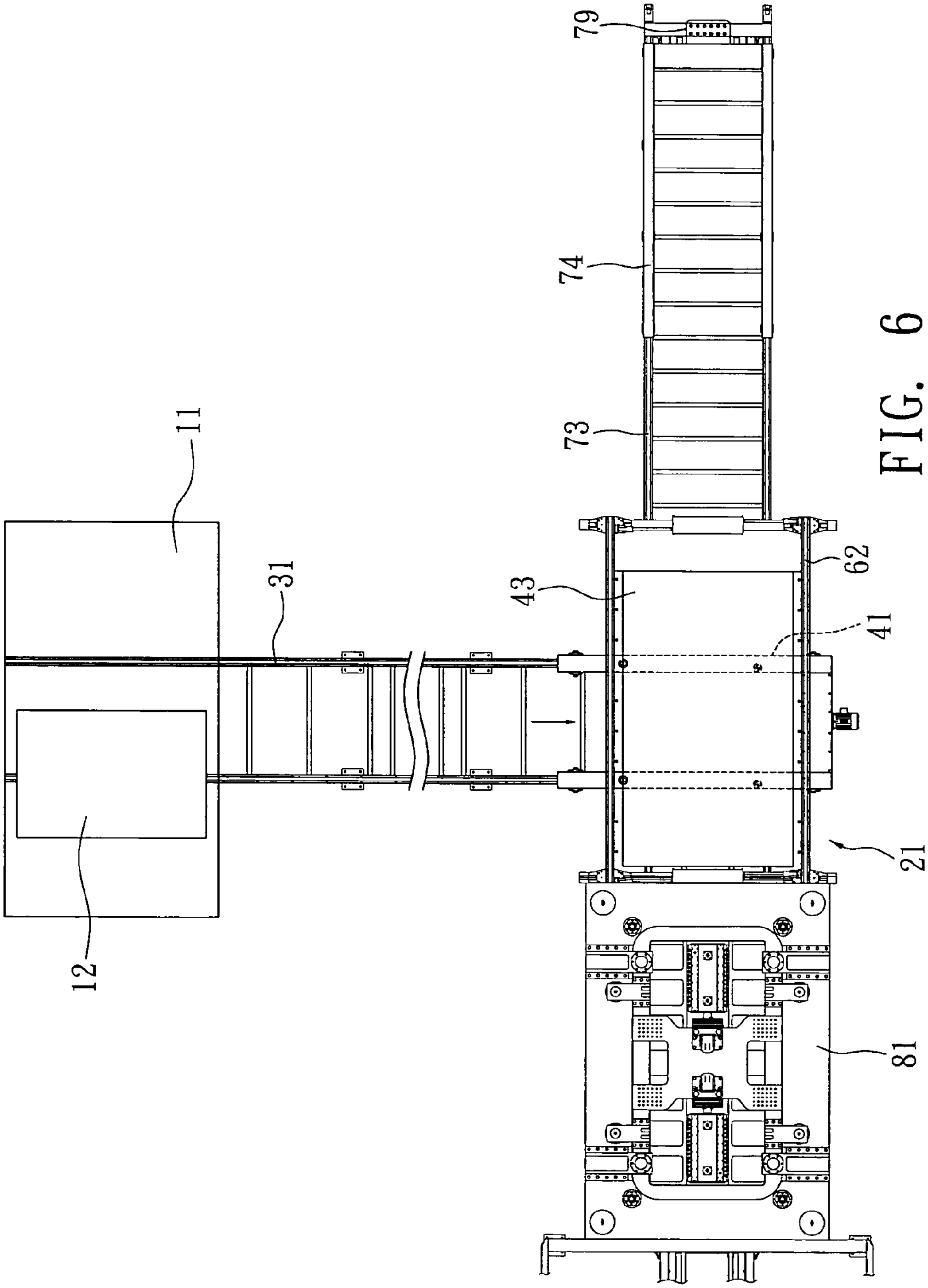
Figure 7:
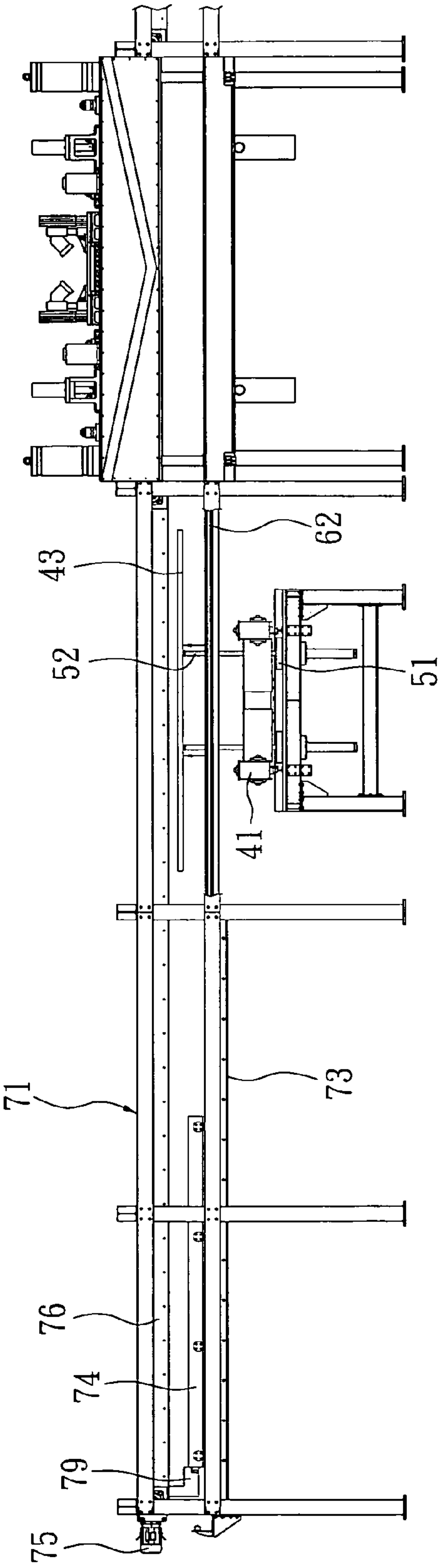
Figure 8:
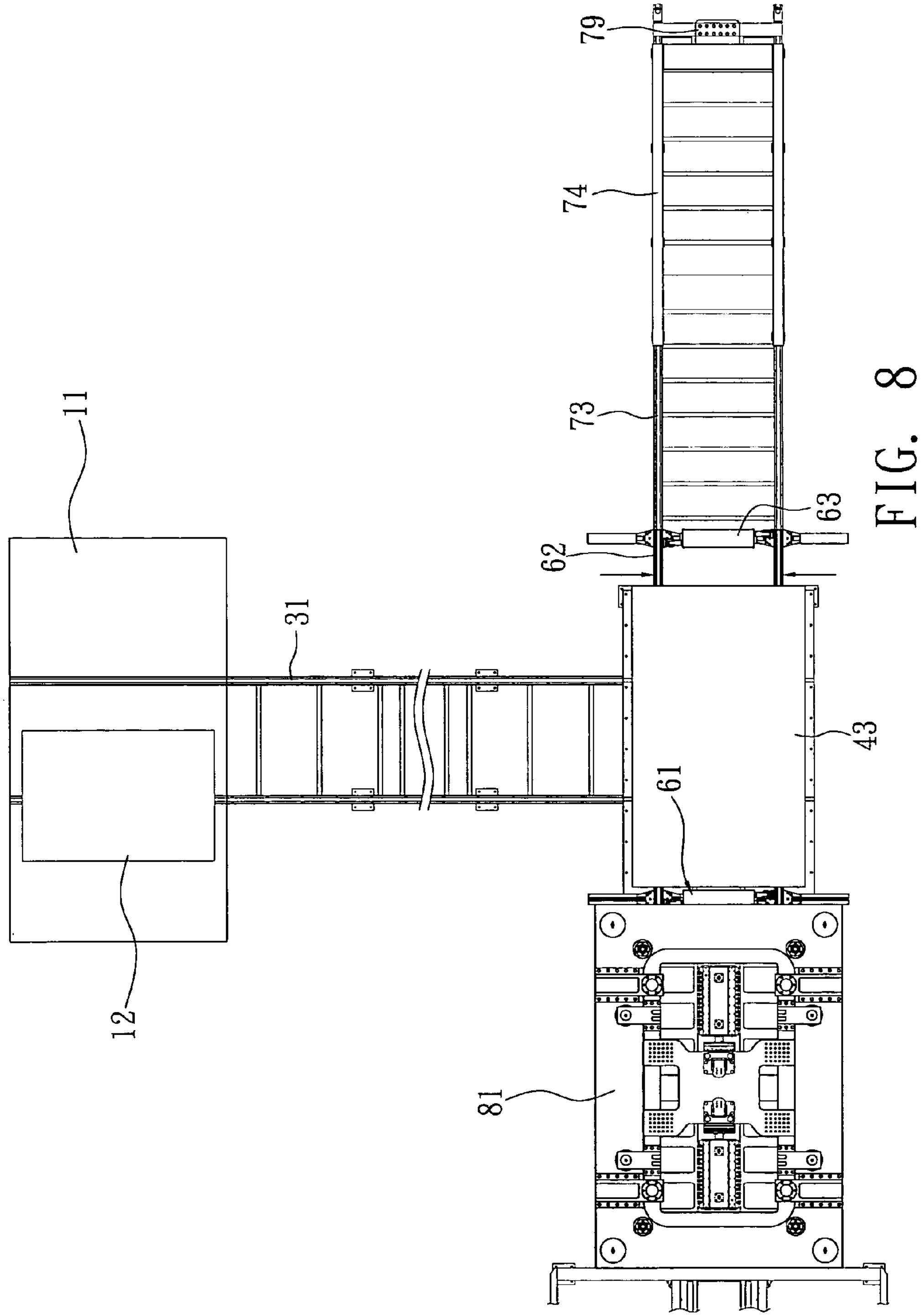
Figure 9:
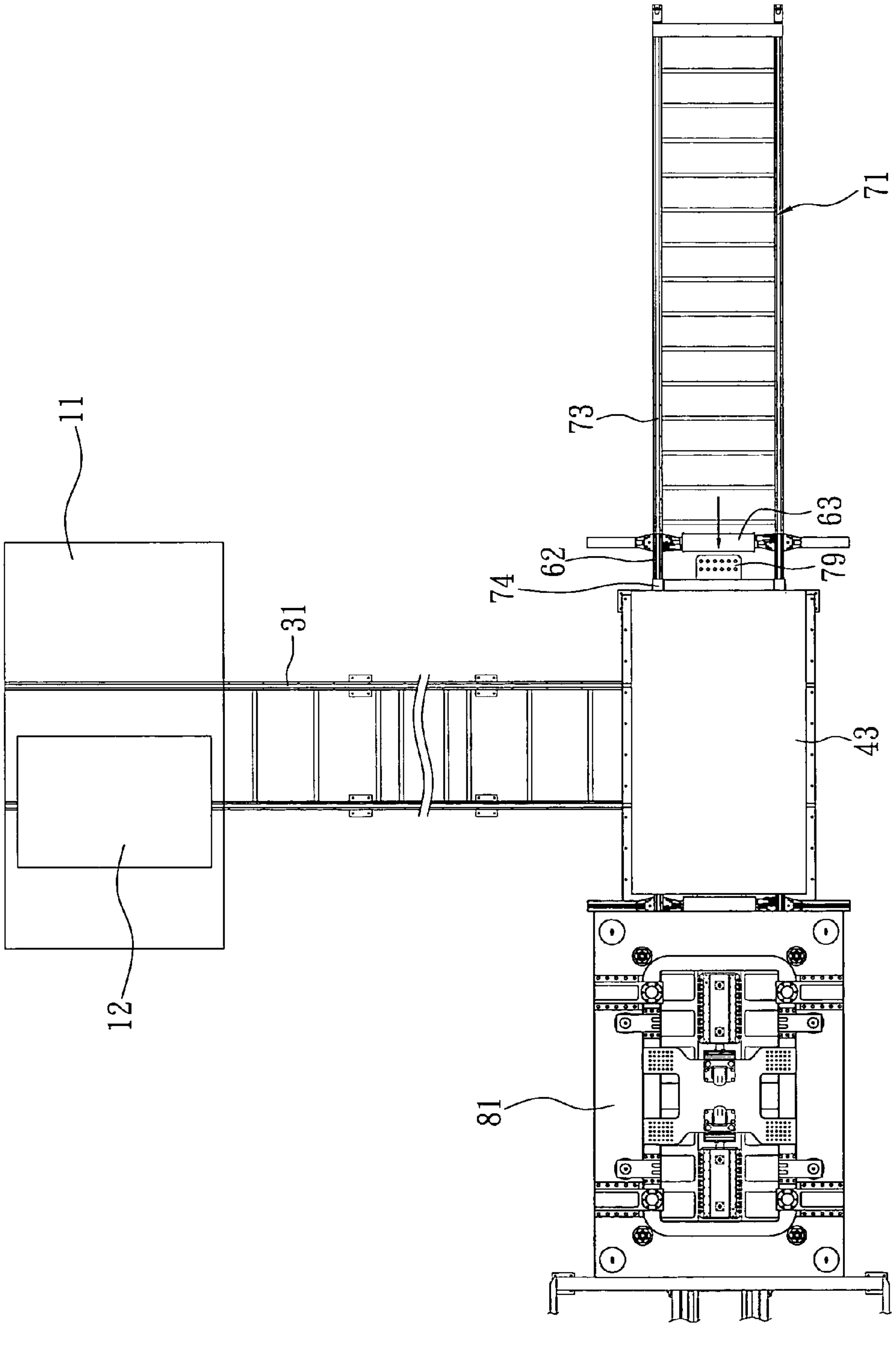
Figure 10:
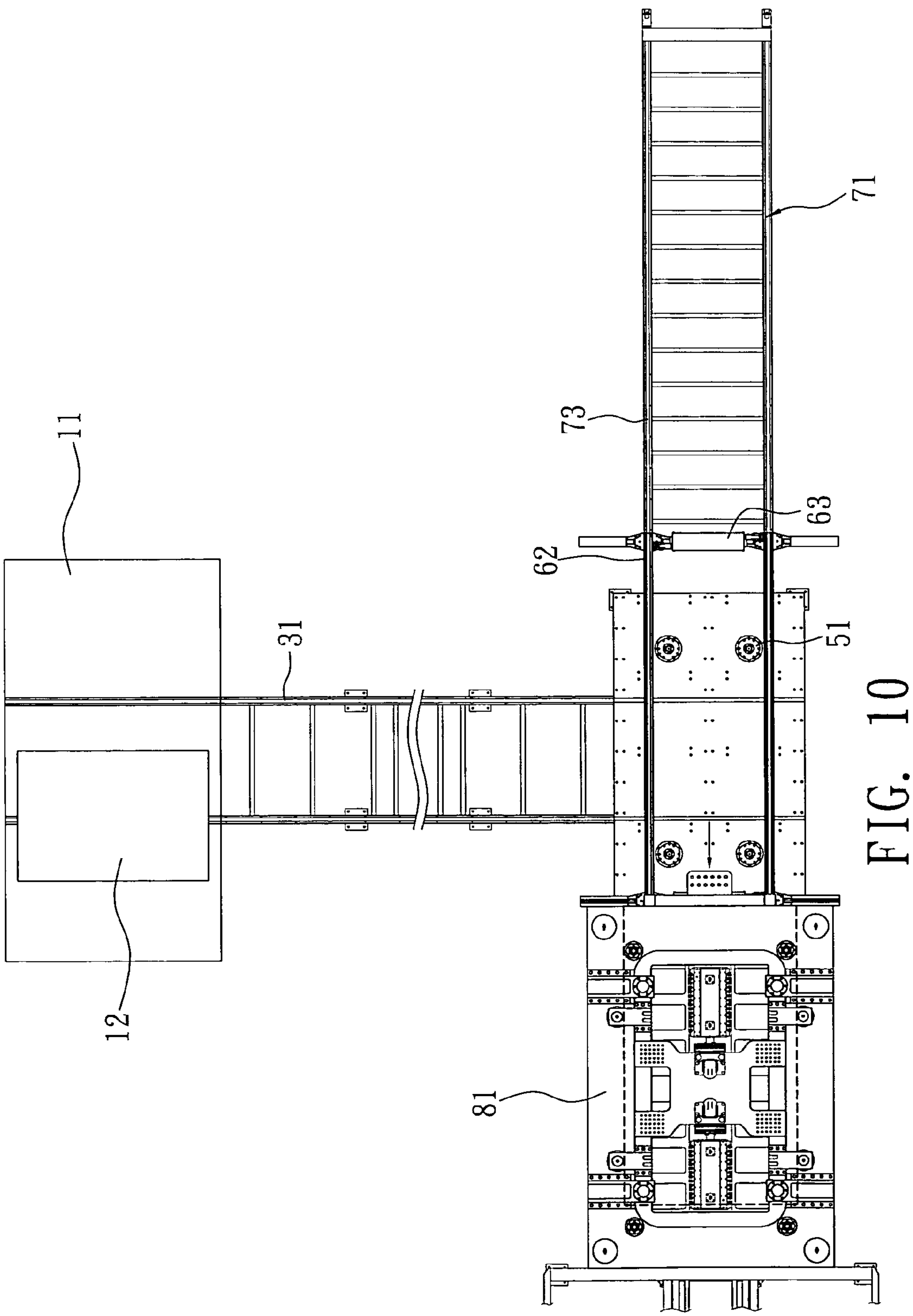

The conveying method for an artificial stone process is performed by using the above members, which is comprises the following steps:

(a) charging step: positioning the trolley 41 under the spreader 12 in the waiting region 11, uniformly spreading stone on the catch basin 43 of the trolley 41 via the spreader 12, as shown in FIG. 5;

(b) transporting step: the trolley 41 starting to travel along the track set 31 to carry the stone to the processing region 21, as shown in FIG. 6;

(c) discharging step: when the trolley 41 carrying the stone to the processing region 21 and enabling the bottom of the catch basin 43 of the trolley 41 and the backup posts 52 of the top bracing unit 51 to correspond to each other, at this time, the backup posts 52 of the top bracing unit 51 starting to be braced upwardly against the catch basin 43 so as to separate it from the trolley 41, as shown in FIG. 7;

(d) engaging step: after the catch basin 43 being top braced by the top bracing unit 51 and separated from the trolley 41, and after the catch basin 43 braced upwardly by the backup posts 53 passing between the two junction rails 62, as shown in FIG. 8, the two junction rails 62 being acted by the pushing assembly 63 and starting to draw closer to each other, being docked with the intermediate rails 73 of the draft gear 71, and then, as shown in FIG. 9, the drag member 79 of the draft gear 71 linking up with the secondary trolley 74, and enabling it to move on the two junction rails 62 which have drawn closer to each other and to the right lower position corresponding to the catch basin 43, when the backup posts 52 descending, the catch basin 43 being braced and held by the secondary trolley 74 on the two junction rails 62, then switched to and carried by the secondary trolley 74, thus completing the step of receiving the catch basin 43 by the engaging mechanism 61;

(e) processing step: when the catch basin 43 being switched to and carried by the secondary trolley 74, the drag member 79 of the draft gear 71 pushing the secondary trolley 74 once again, thereby delivering the catch basin 43 carried along the two junction rails 62 to the processing station 81 for processing, as shown in FIG. 10.

Figure 11:
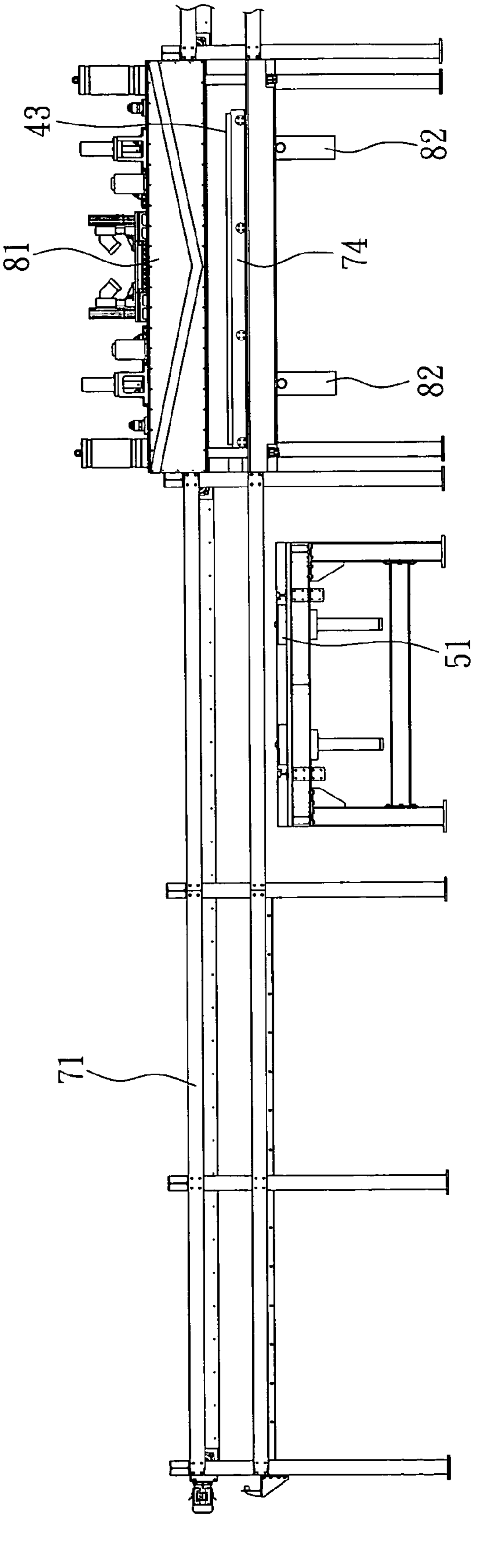
Figure 12:
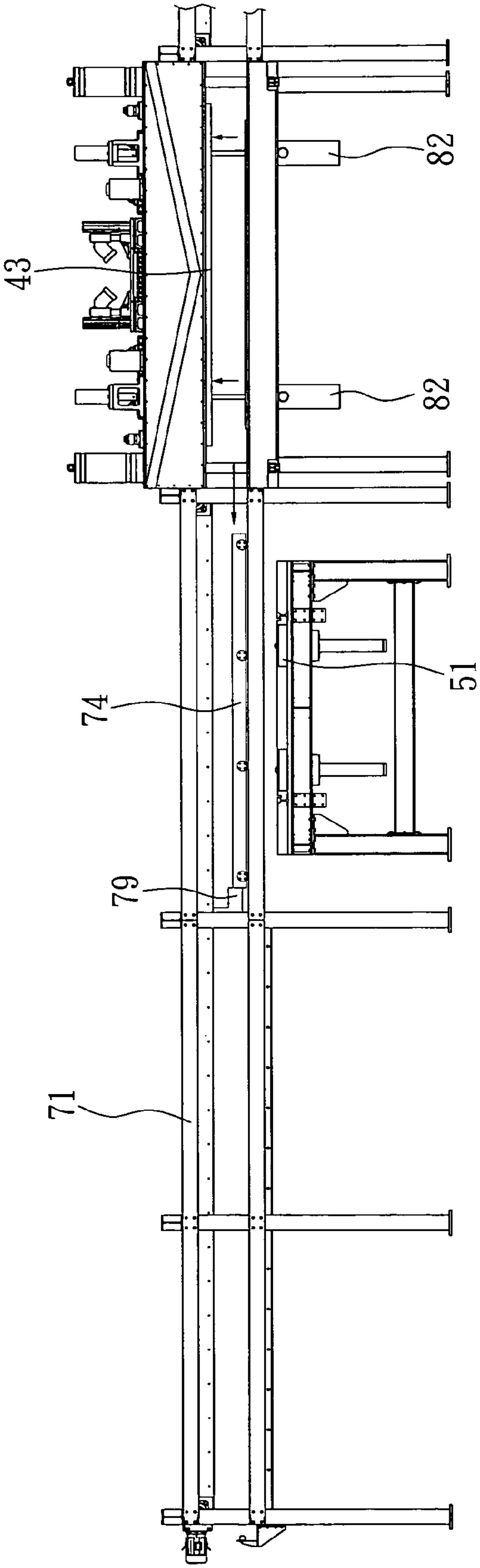
Figure 13:
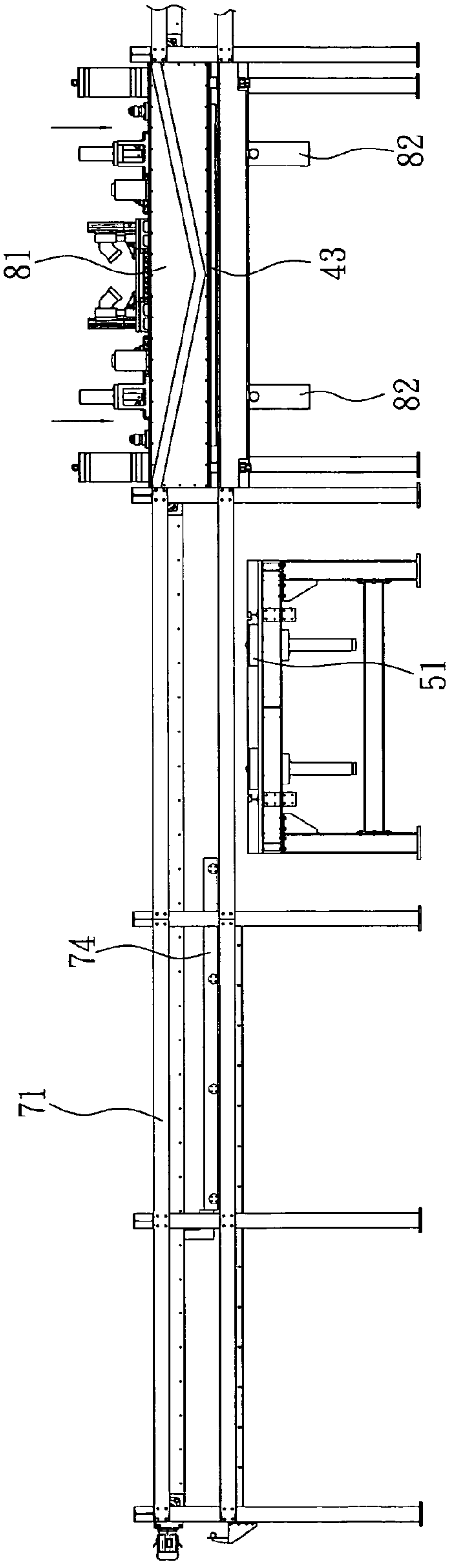
Figure 14:
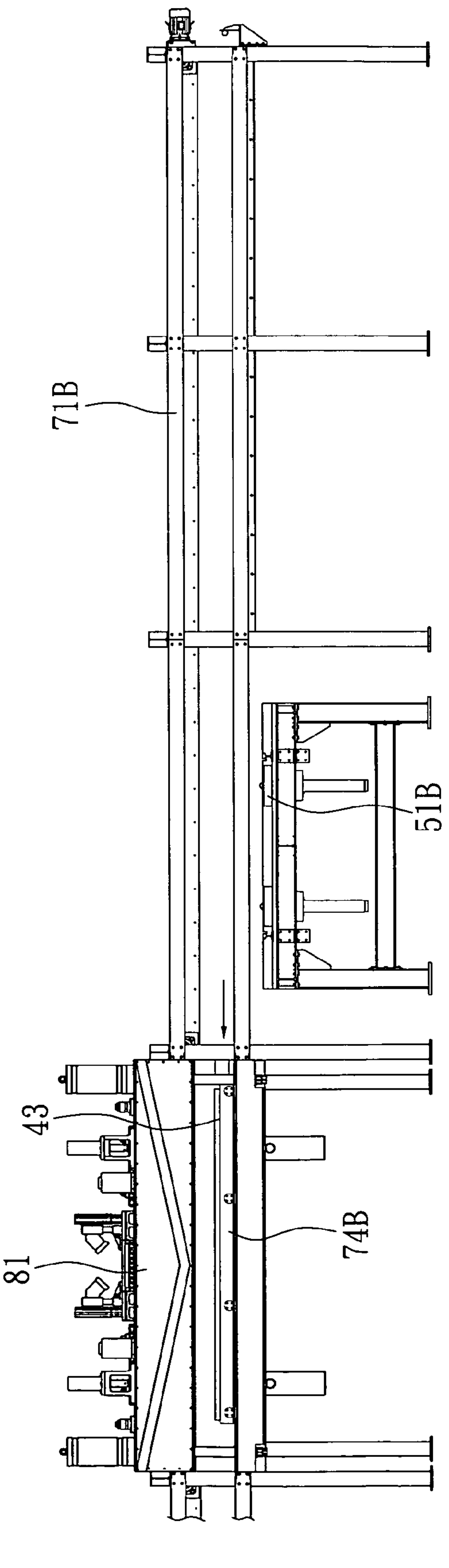
Figure 15:
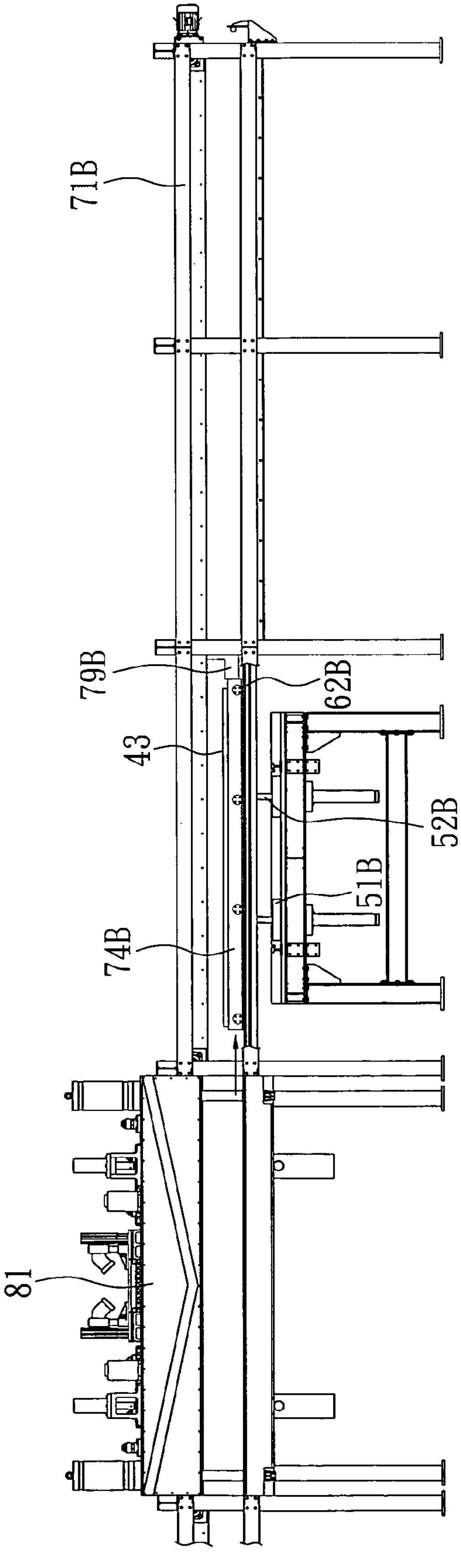
Figure 16:
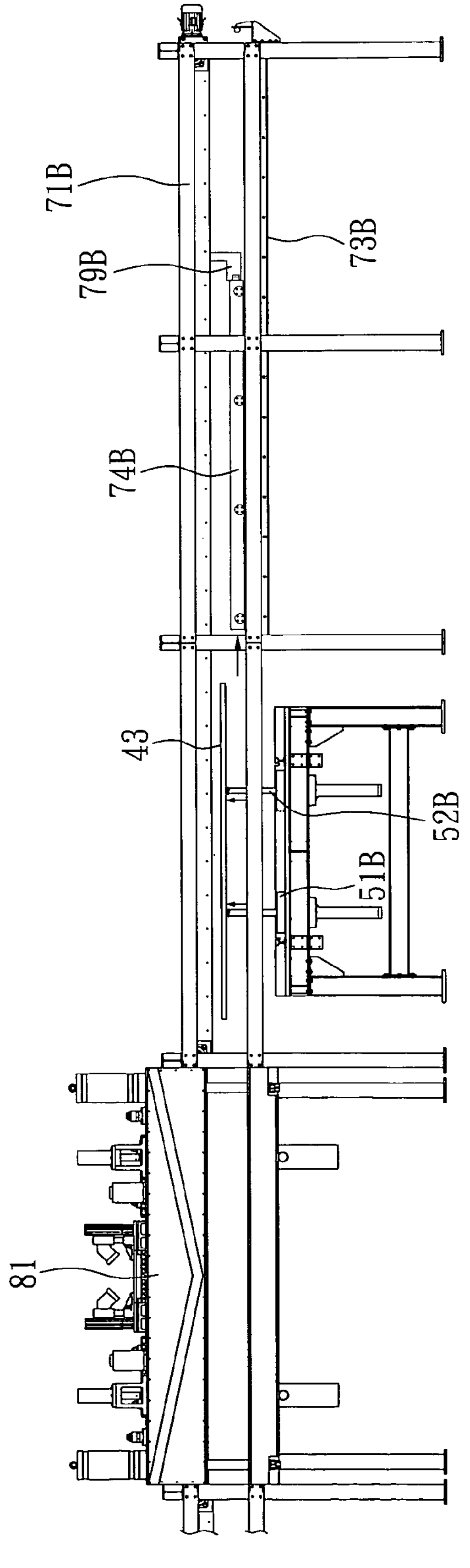
Figure 17:
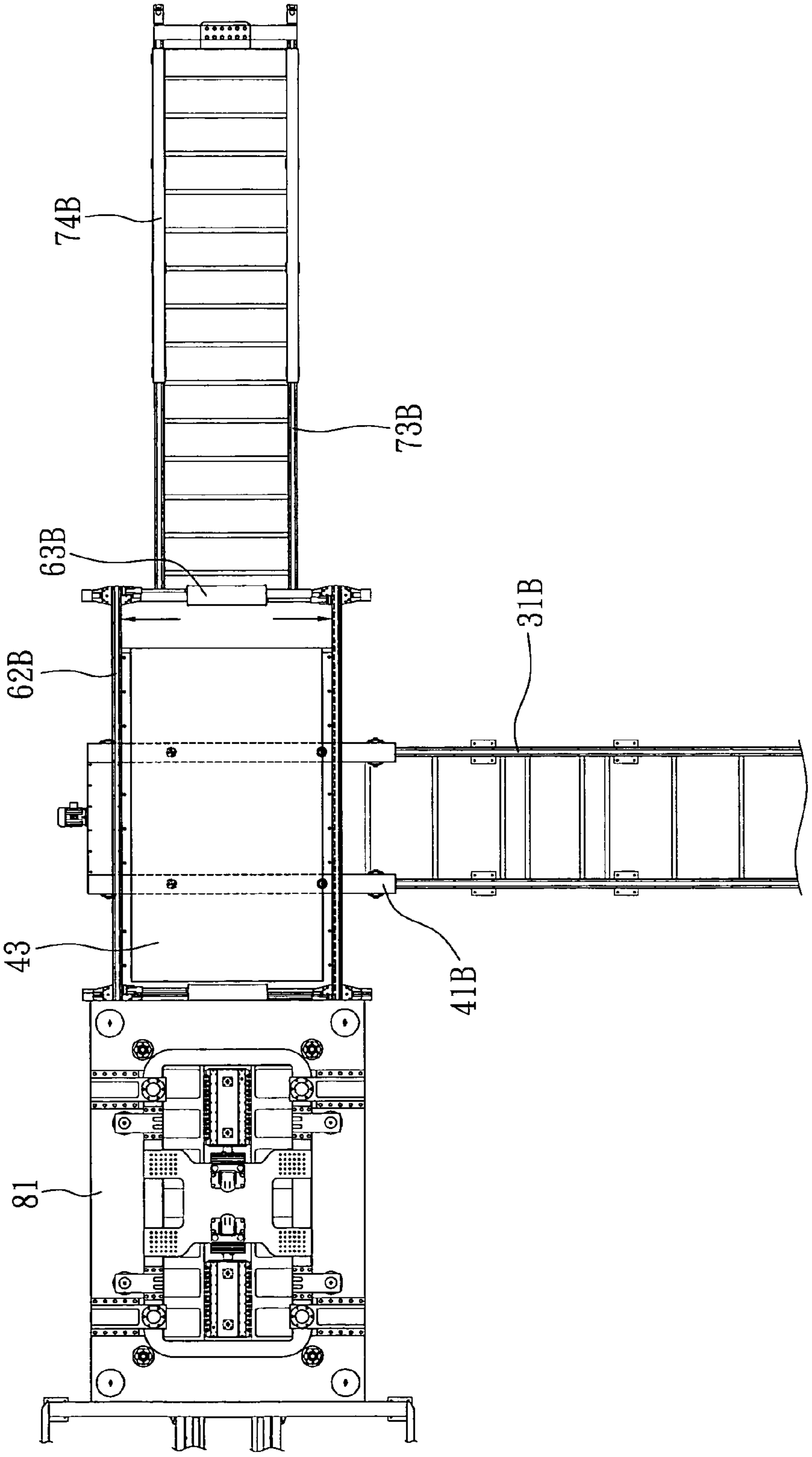
Figure 18:
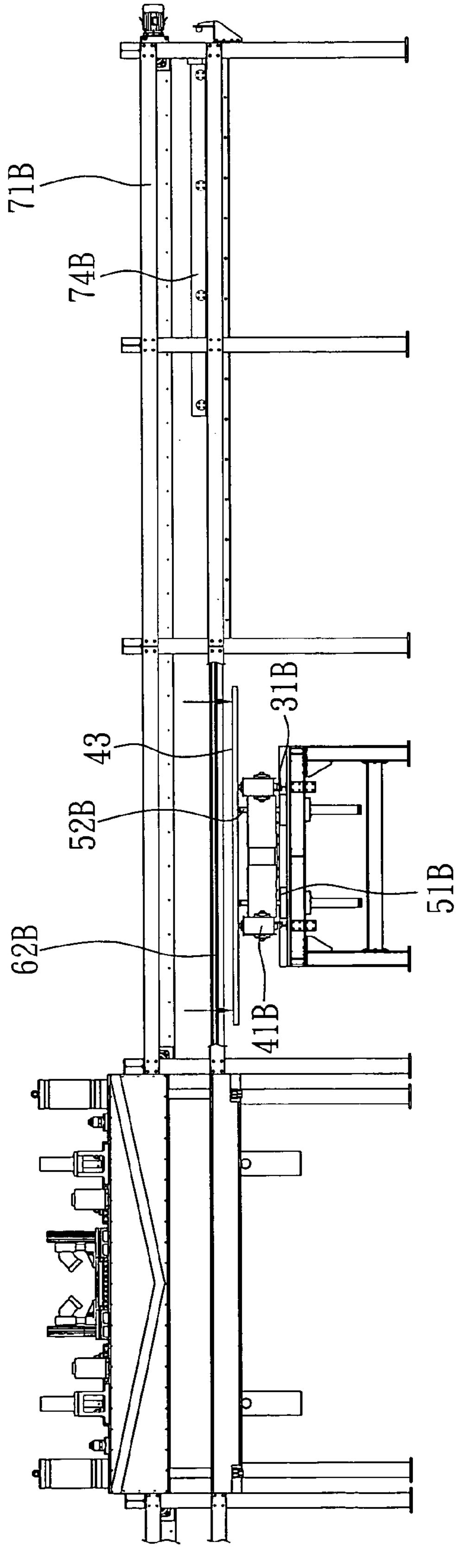

It should be noted that as shown in FIG. 1, a second track set 31B, a second top bracing unit 51B, a second engaging mechanism 61B and a second draft gear 71B are further disposed at the output end of the processing station 81. In this embodiment, the processing station 81 is a compressing processing station and mainly comprised of a press. As shown in FIG. 11, the press has a plurality of oil cylinders 82 such that after the secondary trolley 74 carries the catch basin 43 and sends it into the press, the oil cylinders 82 will prop up the catch basin 43 first to separate it from the secondary trolley 74. At this time, as shown in FIG. 12, the secondary trolley 74 is linked up with the draft gear 71 and exits from the press. Subsequently, as shown in FIG. 13, after the oil cylinders 82 descend, the working surface of the press starts to come down for compressing processing. After the processing operation of the stone on the catch basin 43 in the press has been finished, and after the working surface of the press has been lifted, the oil cylinders 82 of the press are braced upwardly against the catch basin 43 once again. At this time, as shown in FIG. 14, the second draft gear 71B at the output end of the processing station 81 links up with the second secondary trolley 74B on the second draft gear 71B and enables it to enter the press to receive the catch basin 43. Also, as shown in FIG. 15, the catch basin 43 is transported on the junction rails 62B of the second engaging mechanism 61B, and the catch basin 43 is braced upwardly by the backup posts 52B of the second top bracing unit 51B and separated from the junction rails 62B of the second engaging mechanism 61B. At this time, as shown in FIG. 16, the second secondary trolley 74B is returned to the intermediate rails 73B of the second engaging mechanism 71B. Then, as shown in FIG. 17, the two junction rails 62B are acted by the pushing assembly 63B and start to expand. Subsequently, as shown in FIG. 18, the backup posts 52B descend and support the catch basin 43 to pass through the junction rails 62B which have expanded. The catch basin 43 is placed on the second trolley 41B on the second track set 31B and thereby the stone on the catch basin 43 can be transported and carried by the second trolley 41B to the next processing region or an accumulating region.

Figure 19:
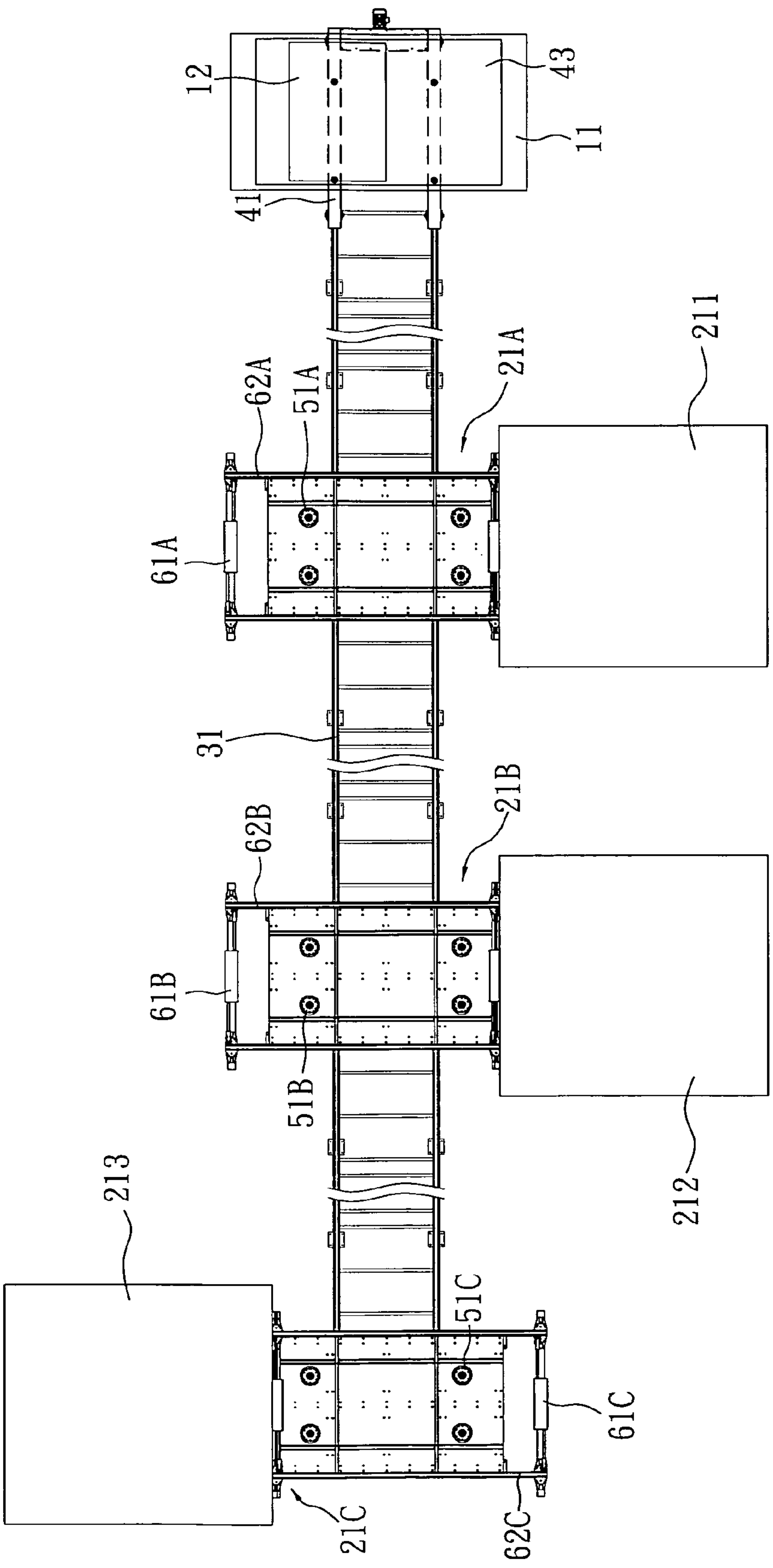
FIGS. 19 to 22 are schematic flowcharts of another embodiment according to the pre sent invention.
Figure 20:
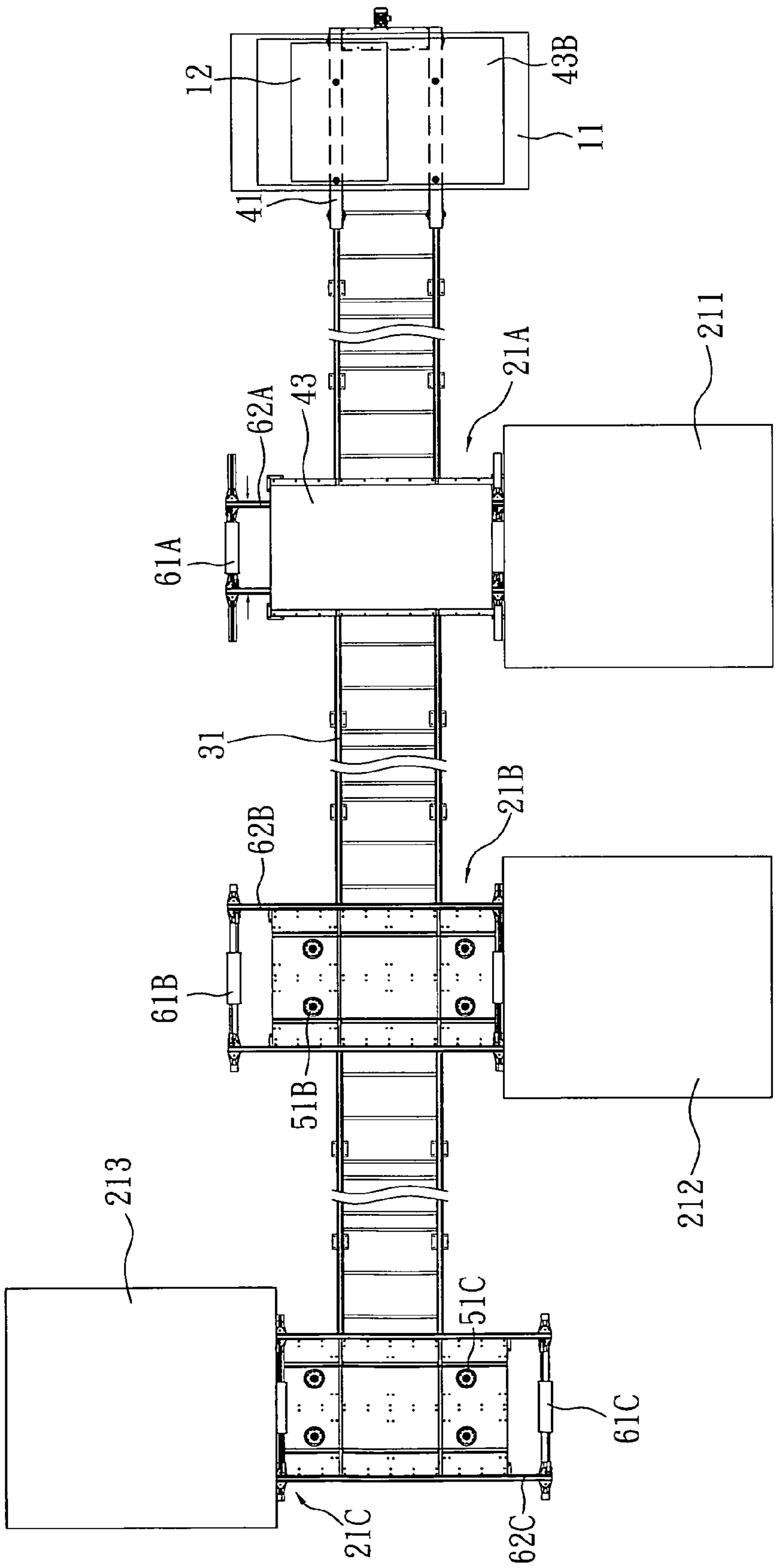
Figure 21:
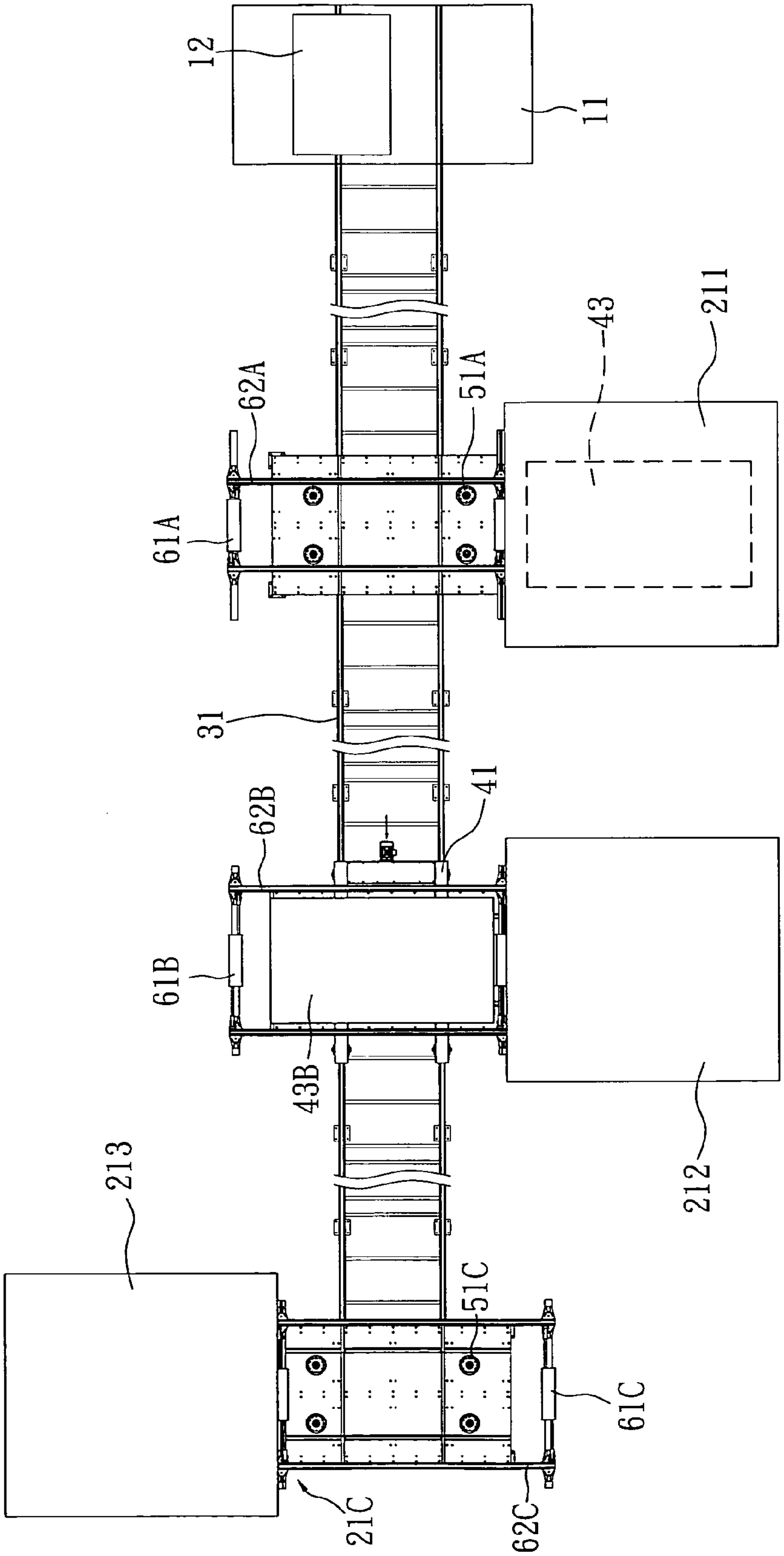
Figure 22:
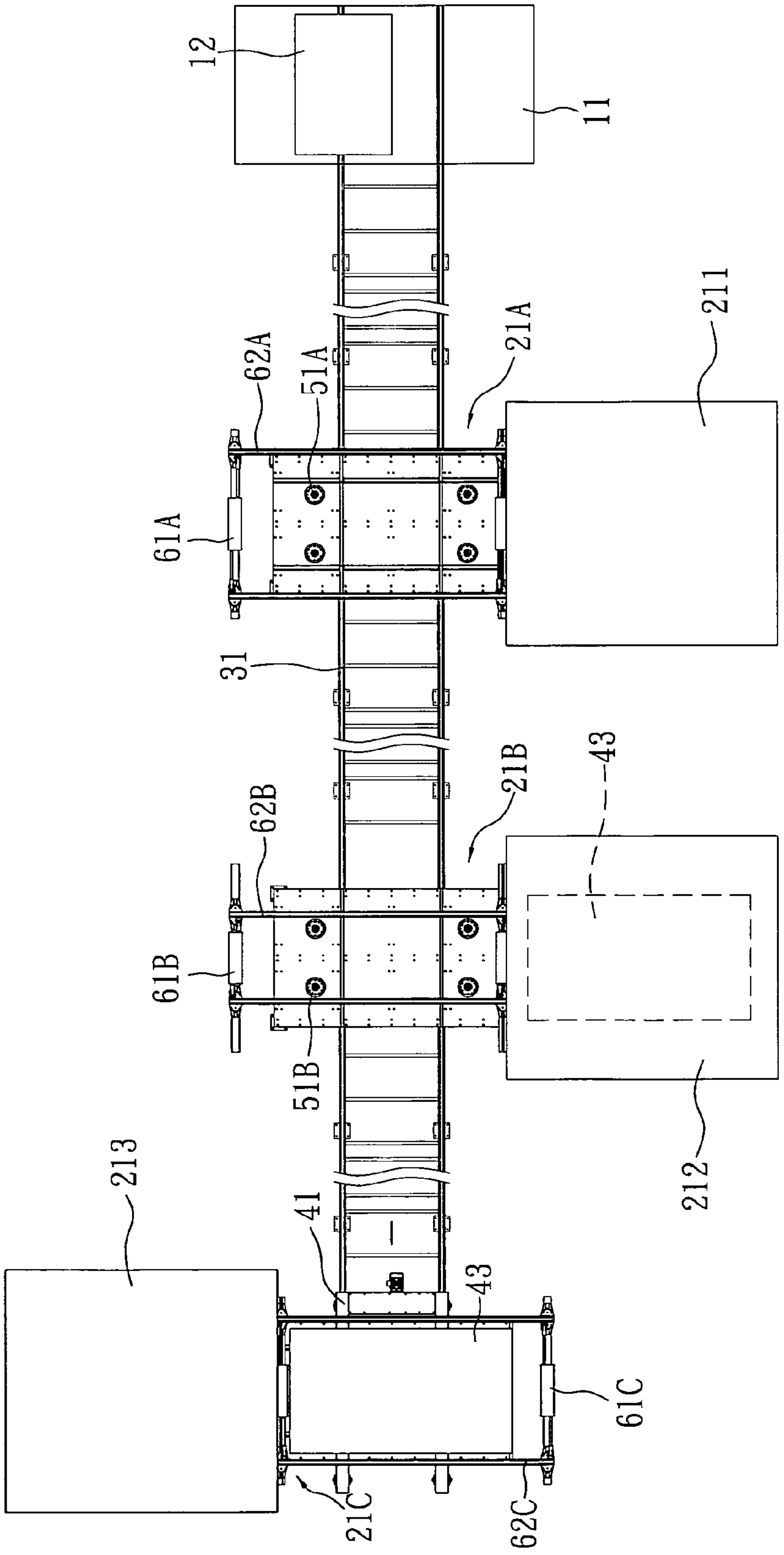

When the present invention is applied to an artificial stone process, as shown in FIG. 19, there are three processing regions in this embodiment, wherein a first processing region 21A has a first patterning station 211, and a second processing region 21B has a second patterning station 212, and a third processing region 21C has a compressing station 213. When the trolley 41 carries stone from the waiting region 11 to the first processing region 21A, the catch basin 43 on the trolley 41 is acted by a first top bracing unit 51A and is braced upwardly, and then the junction rails 62A of a first engaging mechanism 61A receives the catch basin 43 (as shown in FIG. 20) and sends the catch basin 43 into the patterning station 211 for patterning the stone. During patterning the stone, the trolley 41 is returned to the waiting region 11 and conveys another catch basin 43B, which has been loaded with stone, then transporting it into the second processing region 21B. The catch basin 43B is acted by a second top bracing unit 51B and is braced upwardly (as shown in FIG. 21), and then the junction rails 62B of the second engaging mechanism 61B receives the catch basin 43B and enables it to enter the patterning station 212 for patterning the stone. Afterwards, the trolley 41 is turned back to the first processing region 21A so as to receive the patterned stone and conveys it into the compressing station 213 of the third processing region 21C for performing a press operation; in view of the above, during patterning one batch of stone, the trolley 41 can carry another batch of stone for further patterning the stone, thereby to achieve the effect of division of labor and simultaneous operation, thus enhancing the efficiency of an artificial stone process.

Accordingly, the conveying method for an artificial stone process according to the present invention has the following advantages:

1. The conveyance of stone on the track set 31 via the trolley 41 has the features of rapid transportation and high smoothness.
2. Compared with hanging and conveying stone by using a crown block, the present invention which utilizes the combination of the trolley 41 and the track set 31 provides a great improvement in the safety of conveying stone.
3. The conveying method according to the present invention has the effect of division of labor and simultaneous operation, thereby effectively enhancing the process efficiency.

I claim:

1. A conveying method for an artificial stone process comprising:

(a) charging step: placing stone on a trolley provided with a catch basin;

(b) transporting step: the trolley traveling along a track set to carry the stone to a processing region;

(c) discharging step: the processing region having a top bracing unit, the top bracing unit being equipped with a plurality of backup posts, when the trolley carrying the stone to the processing region, the catch basin being braced upwardly by the backup posts of the top bracing unit and separated from the trolley;

(d) engaging step: after the catch basin being top braced by the backup posts of the top bracing unit and separated from the trolley, utilizing an engaging mechanism to receive the catch basin, wherein the engaging mechanism is comprised of two junction rails opposite and parallel to each other, and at least one pushing assembly is disposed between the two junction rails such that the two junction rails can expand and draw closer to each other, and when the two junction rails expand, the catch basin can pass between the two junction rails, and after the catch basin braced upwardly by the backup posts passes between the two junction rails, the two junction rails can be acted by the pushing assembly and start to draw closer to each other, and at this time, the backup posts start to descend such that the catch basin is received by the two junction rails which have drawn closer to each other; and (e) processing step: delivering the catch basin, which is located on the junction rails of the engaging mechanism, to a processing station for processing.

2. The conveying method for an artificial stone process as described in claim 1, wherein a spreader is disposed in the waiting region, and the spreader is used to uniformly spread the stone on the catch basin of the trolley.

3. The conveying method for an artificial stone process as described in claim 1, wherein the trolley is of a U-shaped frame form, and a number of pulleys are disposed at the bottom on each of both sides of the long axis of the trolley, and the trolley is provided therein with a power source to actuate the pulleys on the trolley such that the trolley can move along the track set.

4. The conveying method for an artificial stone process as described in claim 1, wherein after the trolley carries the stone to the processing region, the backup posts just correspond to the bottom of the catch basin.

5. The conveying method for an artificial stone process as described in claim 1, wherein a draft gear is further disposed on one side of the engaging mechanism, and the draft gear is equipped with intermediate rails, and when the two junction rails have drawn closer to each other, the intermediate rails and the two junction rails are docked with each other, and a secondary trolley is disposed on the intermediate rails and actuated by a power source to slide on the intermediate rails and the junction rails which have drawn closer to each other.

6. The conveying method for an artificial stone process as described in claim 5, wherein a drag rail is disposed at the upper position of the intermediate rails, and the drag rail is parallel and opposite to the intermediate rails, and the drag rail is provided therein with a belt gear which can be actuated by a power source to drive a drag member to move, and one end of the drag member is connected to the belt gear in the drag rail and the other end thereof is connected to the end of the secondary trolley such that when the drag member is driven by the belt gear, the drag member can link up with the secondary trolley and enable it to slide on the intermediate rails and the junction rails.

7. The conveying method for an artificial stone process as described in claim 5, wherein when the two junction rails are acted by the pushing assembly and are oppositely connected to the intermediate rails of the draft gear, the secondary trolley moves on the junction rails and to the right lower position corresponding to the catch basin such that when the catch basin descends, it would be braced and held by the secondary trolley on the junction rails, then switched to and carried by the secondary trolley and delivered to the processing station for processing.

8. The conveying method for an artificial stone process as described in claim 1, wherein a second track set, a second top bracing unit, a second engaging mechanism and a second draft gear are disposed at the output end of the processing station, and there is a second trolley provided on the second track set, and there is a second secondary trolley provided on the second draft gear.

9. The conveying method for an artificial stone process as described in claim 8, wherein when the processing operation in the processing station is complete, the second draft gear would link up with the second secondary trolley and enable it to enter the processing station to receive the catch basin, and convey it onto the junction rails of the second engaging mechanism, and the catch basin is braced upwardly by the backup posts of the second top bracing unit and separated from the junction rails of the second engaging mechanism, and then when the second secondary trolley has been returned to the intermediate rails of the second engaging mechanism, the junction rails of the second engaging mechanism are acted by the pushing assembly and start to expand, and subsequently, the backup posts of the second top bracing unit descend and support the catch basin so as to pass through the expanded junction rails of the second engaging mechanism, and the catch basin is placed on the second trolley on the second track set.

* * * * *